3,329,518
PROTEIN GLUE FOR SOUTHERN PINE PLYWOOD

Francis B. Weakley and Charles L. Mehltretter, Peoria, Ill., assignors to the United States of America as represented by the Secretary of Agriculture
No Drawing. Filed June 11, 1965, Ser. No. 463,404
1 Claim. (Cl. 106—157)

ABSTRACT OF THE DISCLOSURE

Hot press adhesives that are particularly effective for forming moisture resistant southern pine plywoods comprise aqueous dispersions containing spray-dried blood, defatted soy flour, dialdehyde starch, sodium silicate, and borax.

---

A nonexclusive, irrevocable, royalty-free license in the invention herein described throughout the world for all purposes of the United States Government, with the power to grant sublicenses for such purposes, is hereby granted to the Government of the United States of America.

This invention relates to a novel process for preparing water-resistant interior type plywoods from softwoods such as southern pine at considerably lower cost than is demanded for the presently used phenol-formaldehyde resin adhesives.

More specifically, this invention relates to the surprising discovery that a novel and inexpensive proteinaceous glue that on application is chemically crosslinked in a hot press operaton has prior to crosslinking a suitably high viscosity for spreading on moderately acidic and highly porous softwood veneers such as southern pine to provide superior plywood and which viscosity is increased during hot pressing so that it can be used as a nonbolting hot press adhesive.

In U.S. Patent No. 3,153,597 we teach plywood glues comprising the reaction product of a borax dispersed protein such as casein or soybean alpha protein with dialdehyde starch. Although the patented products are eminently satisfactory for preparing interior type plywood from the closely grained hardwoods, e.g., birch which are simply cold pressed, our patented plywood glues begin to lose viscosity above 75° F. and are unsuited for use under the hot press conditions (about 266° F.) usually employed with highly porous woods where the viscosity must be preserved to prevent excessive penetration and marked loss of strength-providing adhesive solids from the glue line as well as to prevent the appearance of unsightly bolting defects. In addition, the plywood manufacturers in the region where southern pine is plentiful have been using the phenol-formaldehyde resin adhesives and are equipped only for hot press operations.

Commercially available hot press protein glues used in the manufacture of interior plywood mainly from Douglas fir comprise highly alkaline dispersions of spray-dried blood mixed with low cost extenders such as soy or wood flour. One of the purposes for such high alkalinity (pH about 12–13) in bonding Douglas fir veneers is to neutralize the highly acidic hydrophobic surface of the kiln dried veneer and thus allow the glue to sufficiently wet the wood for adequate bonding. When the alkalinity of a protein-based glue is reduced to about pH 9 the glue is not sufficiently basic to penetrate the hydrophobic highly acidic surface of the Douglas fir wood and adequate wettability of veneers thereof for good bonding is not achieved. Inasmuch as southern pine wood is not as acidic as Douglas fir wood, the free alkali of the prior art protein-based glues when the latter are used with southern pine is not appreciably lowered and the undesired excess alkalinity remaining apparently degrades the polymeric structure of the protein during hot pressing and results in a reduction in adhesive properties so that these glues are unsuitable for laminating southern pine veneers into plywood in a hot press operation.

The principal object of the present invention is a hot press glue whose moderately alkaline pH is sufficient for the mildly acidic, highly wettable surface of southern pine veneer, and whose viscosity at the glue line is actually somewhat increased under hot press operations rather than being sharply decreased, thereby preventing such excessive penetration of the glue into the southern pine veneer that not enough remains at the glue line to provide adequate adhesion. Another object is a thermosetting adhesive having sufficient strength to prevent or minimize the delaminating strains and unequal swellings of oppositely oriented adjacent plies of southern pine that result from the marked tendency of softwoods and especially of southern pine to absorb water, e.g., southern pine that is immersed for 4 hours absorbs about 50 to 60 percent of its original dry weight thereof.

The above and other objects which will become apparent hereinafter have now been realized in the instant invention wherein it has been discovered that softwood veneers and especially those of southern pine can be bonded together in existing hot press equipment with a low cost slightly alkaline proteinaceous glue comprising spray-dried blood, soy flour, and dialdehyde starch. Viscosity of the glue is compatible with the hot press conditions required for good bonding. It is pointed out that the present invention is not to be confused with that described and claimed in our copending application S.N. 69,237, filed Nov. 14, 1960, now U.S. Patent No. 3,188,-223, the compositions of which are inoperative for the purposes of the instant invention and vice versa.

The glue formulation consists essentially of soy flour, soluble dry blood, and dialdehyde starch with minor amounts of chemicals for solubilizing these components. However, the method of formulating the glue for application is critical.

In formulating the adhesive the amount of dialdehyde starch used will be above 1.25-percent and preferably at the 2.5-percent level based on the combined weight of the soy flour and blood in the glue. For the purpose of illustrating the invention the viscosity of the aqueous soy flour-blood glue was conveniently determined with a Brookfield viscometer. Water resistance of the southern pine plywood bonded with the glue of the invention was evaluated by conventional shear strength tests, cyclic wet and dry tests for resistance to delamination and by outdoor exposure testing. Results of the conventional tests established that the plywood produced with the glue of the invention met recognized commercial standards for interior grade plywood.

Example 1

20 parts of soluble spray-dried blood were dispersed in 160 parts of water at 75° F. Then 20 parts of defatted 200-mesh soy flour were added and uniformly dispersed by mechanical stirring. Following the addition and dispersion of 9 parts sodium silicate, there were added 4 parts of powdered borax and another 45 parts of water. Then 10 parts of a 10-percent dialdehyde starch dispersion prepared by stirring into 89 parts by weight of water at 140° F., 10 parts by weight of dialdehyde starch (such starch is commercially produced by periodate oxidation; see Patent No. 3,153,597) followed by the addition of 1 part by weight of powdered borax, heating at 163° F.

for about 15 minutes to disperse the dialdehyde starch, and cooling immediately to room temperature. The composition was completed by dispersing therein 2 parts of sodium pentachlorophenate.

About 15 minutes after standing when the glue had a viscosity of 160 cps. at 77° F. a portion of it was spread on a thin metal plate heated to 266° F., the temperature of the hot press operation, and within a few minutes the glue became a rubbery gel. A rubbery gel was also produced at 212° F. in a separate trial.

We claim:

Southern pine plywoods produced by hot pressing layers of southern pine veneer, each layer having been coated prior to the hot pressing step with a thermally crosslinkable glue comprising an aqueous dispersion having a pH of 9–9.2 and containing per 100 parts by weight thereof (a) 7.4 parts of soy flour, (b) 7.4 parts of spray-dried blood, (c) about 3.3 parts of sodium silicate, (d) about 1.5 parts of borax, (e) about 0.7 part of sodium pentachlorophenate, and based on the combined weight of (a) and (b) about 0.7 part by weight of borax-dispersed periodate-oxidized dialdehyde starch, said plywoods being characterized by high resistance to moisture-induced delamination.

References Cited
UNITED STATES PATENTS

| | | | |
|---|---|---|---|
| 2,872,421 | 2/1959 | Shelton et al. | 156—328 |
| 3,153,597 | 10/1964 | Weakley et al. | 106—139 |
| 3,188,223 | 6/1965 | Weakley et al. | 106—139 |

ALEXANDER H. BRODMERKEL, *Primary Examiner.*

T. MORRIS, *Assistant Examiner.*